March 10, 1964   A. K. LLOYD ETAL   3,124,208
AUTOMATIC CONTROL OF WEIGHING AND FEEDING MACHINES
Filed Feb. 6, 1961
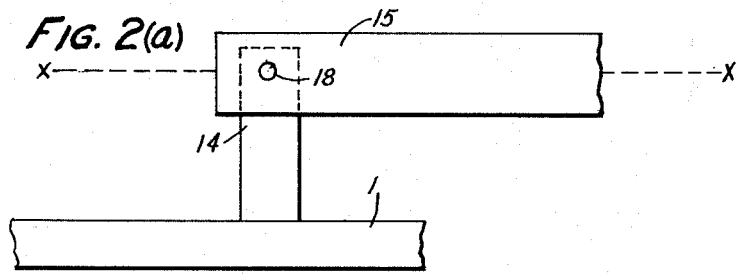
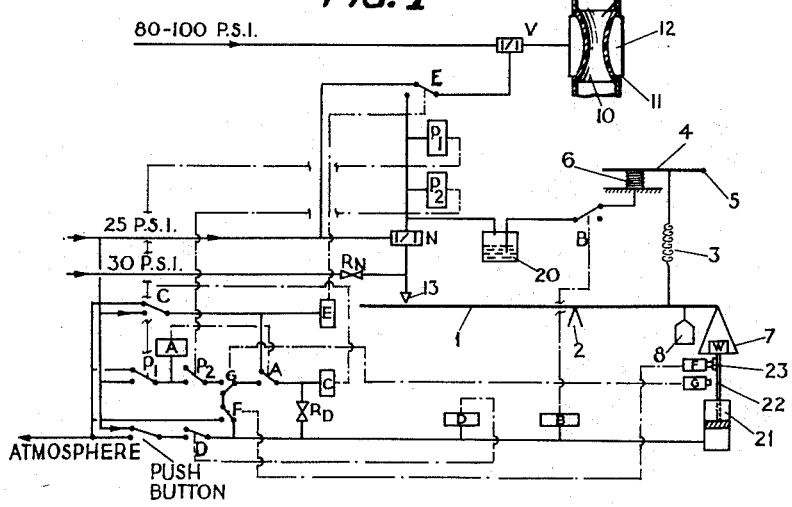
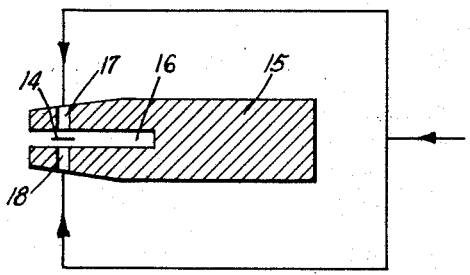
INVENTORS
ARTHUR KENNETH LLOYD
RAYMOND ALAN LOLLEY
BY Cushman, Darby & Cushman
ATTORNEYS United States Patent Office 3,124,208
Patented Mar. 10, 1964

3,124,208
AUTOMATIC CONTROL OF WEIGHING AND FEEDING MACHINES
Arthur Kenneth Lloyd, Welwyn, and Raymond Alan Lolley, St. Albans, England, assignors to Imperial Chemical Industries Limited, London, England, a corporation of Great Britain
Filed Feb. 6, 1961, Ser. No. 87,178
Claims priority, application Great Britain Feb. 10, 1960
16 Claims. (Cl. 177—105)

This invention relates to improvements in the control of automatic weighing and feeding machines.

Many different kinds of weighing machines are known and have been proposed in which the feed of material to the weighing machine is automatically ended when a required weight has been fed. Where the material is fed to a container carried by the weighing machine it is generally desirable to tare the container before feeding starts, and many proposals have also been made for doing this.

It has been proposed to use a pneumatic system to shut off the feed of material to the weighing machine when a desired weight has been fed. We have now found that it is possible to make use of a pneumatic system to automatically tare the weighing machine as well as terminate the feed.

According to the present invention we provide an apparatus for automatically controlling the feed of flowable material to a container supported on weighing equipment, said apparatus comprising a pneumatic measuring device having a chamber restrictively connectable to a source of constant air pressure, the chamber having a small orifice from which said air emerges, the device being capable of attachment to a weighing machine such that change of weight over a predetermined range of weights upon said weighing machine causes relative movement between said chamber and an element of the weighing machine and such that air issuing from said orifice impinges on said element during at least part of the said relative movement, progressive reduction of the free space near said opening resulting from said movement causing an increase in the back pressure in said chamber which back pressure is operatively connectable to control a feeding device for the flowable material such that at a predetermined pressure the feed is stopped, adjusting means acting on at least part of the weight-counterbalancing means of the weighing machine and being provided to restore said chamber and element to a desired balance position when any weight causes departure therefrom, the adjusting means comprising a fluid-containable vessel capable of attachment to the weighing machine having a part that is caused to move by change of pressure within said vessel to give rise to a force that effects a displacement of at least part of the weight-counterbalancing means in a direction to restore said balance position, said chamber and vessel being connectable through a communicating connection so that any pressure change in said chamber during adjustment is followed by a corresponding change in said vessel to maintain a fixed pressure-relationship between them, adjustment ceasing when said force balances the force produced by said any weight and means under the control of the back pressure in said chamber being provided to thereupon lock said adjusting means so that no further adjustment takes place with a further change in weight.

Further in accordance with our invention we provide weighing equipment comprising our said apparatus.

We prefer that the relationship between the back pressure developed in said chamber and the linear movement of the weight measuring element which brings about reduction of the free space in the pneumatic measuring device should be of the second or higher order. This is preferred because it allows very accurate control of the feed cut-off to be exercised. We further prefer that as the back pressure increases there should first be a slow rise in back pressure with linear movement of the element, which rise increases in slope, passes through a point of inflection and then increases again. The apparatus used to effect this result is most conveniently one in which the element is in the form of a thin flat metal strip that moves parallel to and in close proximity to the face of said chamber containing the orifice to progressively reduce the size of the orifice as the weight increases. It will be appreciated that various shapes of opening can be used, but to obtain our preferred result we prefer to use a circular opening.

In order that our invention may be more fully understood one embodiment thereof is illustrated with reference to the accompanying drawings FIGURES 1, 2(a) and 2(b). FIGURE 1 illustrates the layout of the pneumatic circuit by which the weighing operation is controlled. FIGURE 2 illustrates in more detail the arrangement of said chamber and element. To simplify the layout of the pneumatic circuit the control valves are subdivided so that the mechanism that operates the valve is separate from the basic valve unit. Broken lines are shown in FIGURE 1 as connecting the control valve to its related operating mechanism for purposes of clarity. The port connections of each valve unit are shown when the operating mechanism is de-energised.

In FIGURE 1, the beam of the weighing machine is shown at 1, supported on the fulcrum 2. The counteracting mechanism for the beam is the spring 3 which is attached at its upper end to the lever 4. Lever 4 is supported at one end by a pivot 5, and at the other by the oil filled bellows 6. The beam 1 carries at one end, on the same side of the fulcrum as the spring, a support 7 for a standard weight W. Near the same end of the beam is a support 8 for a container e.g. a drum, sack or the like, into which flowable material can be fed from an automatic feeder through the sleeve valve 9. The sleeve valve consists of an elastic or compressible tube section 10 surrounded by a rigid tube 11 to form the chamber 12. Air can be fed under pressure into the chamber 12 to compress the sleeve valve and so reduce and ultimately stop the flow of material through the valve.

On the other side of the fulcrum is a pneumatic measuring device generally shown at 13. This is shown in greater detail in FIGURES 2(a) and (b) to which reference is now made. FIGURE 2(a) illustrates a side view of this device and FIGURE 2(b) is a sectional plan view of part of the device through the line X—X. In FIGURE 2(a) a section of the weighing machine beam 1 is shown carrying a flat metal strip 14 which is fixed to the upper side of the beam in an upright position. A metal block 15 having a vertical slit 16 is attached to a non-moving part of the weighing machine so that the flat metal strip 14 can move vertically in the vertical slot 16 in the metal block as the beam moves. The block has two horizontal chambers 17 and 18 directly opposite each other on either side of the slot. The chambers 17, 18 are connected to a common air supply as shown by the arrowed lines, those parts of the chambers opening into the slot 16 forming orifices from which streams of air are directed into the slot.

The movement of the beam is limited by stops (not shown) to eliminate unnecessary movement, but the stops are placed to ensure that the left hand side of the beam can move downwards sufficiently to allow the holes 17 and 18 to be completely uncovered by the flat metal strip 14 and also that it can move upwards sufficiently to allow the flat metal strip 14 to completely cover the chambers 17 and 18 and to extend slightly above them. The balance point for any particular weighing cycle is arranged to occur when the back pressure caused by covering the orifice of the chambers 17 and 18 by the flat metal strip 14 has reached a pre-determined value. The stops are preferably arranged so that the movement of the beam corresponds to the addition of the last 10 to 20% of the filled weight of material. In this particular embodiment the flat metal strip is 0.010 inch thick, the slot is 0.012 inch wide, and the orifices of the chamber are each 0.040 inch in diameter.

Returning to FIGURE 1, the bellows 6 is supported on a nonmoving part of the weighing machine and is connected through the valve B to an oil separator 20. Underneath the standard weight W is a pneumatic cylinder having a piston 22 which when at the upper limit of its stroke lifts the weight W from its support 7. On the side of the piston 22 is a projection 23 which is adapted to operate position valves F and G as it moves in a vertical direction. The valves F and G are each energised when the projection 23 comes into contact with them.

In the pneumatic circuit, A, B, C, D, E, F and G are each normal three port valves, and N and V are 1:1 relays. $P_1$ and $P_2$ are precision relays, $P_1$ operating at pressures above 15 lbs./sq. inch, and $P_2$ operating at pressures below 16 lbs./sq. inch. Three sources of air pressure are used viz., one at 80 to 100 lbs./sq. inch, one at 25 lbs./sq. inch and one at 30 lbs./sq. inch. The 80–100 lbs./sq. inch source is used, under the control of relay V to operate the sleeve valve 9. The 30 lbs./sq. inch source is fed through the restrictor $R_N$ to the pneumatic measuring device 13. The back pressure in 13 is at a minimum when the flat metal strip 14 is clear of the orifices of chambers 17 and 18 and increases as this strip 14 rises to cover these holes. It controls the operation of relay N to allow air from the 25 lbs./sq. inch source to pass at the same pressure as the back pressure in 13, to the precision relays $P_1$ and $P_2$, to that one of the two entry ports of valve E which is connected with relay V when E is energised to allow air at the same pressure to pass through relay V from the high pressure source, and also to the oil separator 20 to cause oil to pass to or from the bellows 6 via valve B.

The one to one relays each consist essentially of a closed vessel divided into two by a flexible diaphragm. One side of the divided vessel is connected by an air line to the controlling air pressure (in the case of relay N the controlling pressure is the back pressure in the air chambers of device 13). The other side of the divided vessel is connected to an air supply maintained at a pressure higher than maximum controlling pressure (e.g. in the specific embodiment 25 lb./sq. inch). This air supply is supplied to the other side of the diaphragm through a small ball valve which is controlled by the diaphragm. An escape nozzle is also provided so that excess of air is exhausted to atmosphere. Under equilibrium conditions the diaphragm takes up such a position as to allow the air to escape through the nozzle at the same rate at which it is supplied through the ball valve, and the pressures on either side of the diaphragm will be substantially equal. The side of the diaphragm supplied with air at the higher pressure is also equipped with an exit line to allow air to pass from the relay in relatively large quantities at the control pressures. Pneumatic relays of this kind are commercially available. For example, pneumatic relays that have been found suitable for use in this invention may be obtained from Sunvic Controls Ltd. of London, England, under Model Nos. 58S, 61F, 61FZ, 61FL, 61H, 67–25, 67–25R, 67–100, and 67–100R.

It will be appreciated that the relay can be adapted in known manner to cause air to be passed on through the exit line at a pressure which is in a predetermined fixed ratio (either greater or lower) to the control air pressure.

The 25 lbs./sq. inch supply, as well as passing through relay N to the normally isolated port of valve E, is connected to the normally connected port of valve E, so that when valve E is de-energised the pressure of 25 lbs./sq. inch operates relay V. The 25 lbs./sq. inch source is also connected to one of the ports of valve C and thence when C is energised it is caused to be fed through valve C to the operating mechanism of valve E so that valve E is energised; it also passes, when valve C is energised, through one of the ports of valve A in the de-energised position to valve C and thus keeps valve C energised; valve C when de-energised has its outlet port open to the atmosphere.

The 25 lbs./sq. inch supply also passes in parallel to one port of precision relay $P_1$ and then when $P_1$ is energised to operate valve A; it also passes from $P_1$ in parallel to one port of valve $P_1$ and through $P_2$ when energised to one port of valve G. When valve G is energised the 25 lbs./sq. inch supply is passed to one port of valve A, and thence when A is energised to the operating mechanism of valve C.

The 25 lbs./sq. inch supply also passes in parallel through the push button switch, when not operated, to one port of valve D, and then when D is energised to energise valves D and B and to the pneumatic cylinder 21.

It will be appreciated that in view of the different distances of the supports 7 and 8 from the fulcrum, the value of W is arranged to be such that its moment about the fulcrum is the same as that of the net weight to be filled.

The operation of the apparatus will now be described in detail. In normal operation at the end of one weighing cycle valve D is energised so that air from the 25 lbs./sq. inch supply is fed to the pneumatic cylinder 21 to keep the piston in the raised position with the standard weight clear of its support 7. At the same time valve B remains energised keeping the oil-filled bellows 6 sealed.

On removal of a filled container from the support 8 the left hand side as seen in FIG. 1 of the beam tilts downwards so that the back pressure in 13 is reduced. A new container is then put on the support 8 and the push button operated. The following table shows the state of each valve at every stage of the operation. From this it will be seen that when the push button is operated valves D and B open to the atmosphere and are thus de-energised causing bellows 6 to be connected to the oil separator 20 and the lower part of cylinder 21 to be open to the atmosphere.

| Operation | Position of Valve | | | | | | | | | Piston of Pneumatic Cylinder 21 |
|---|---|---|---|---|---|---|---|---|---|---|
| | A | B | C | D | E | F | G | $P_1$ | $P_2$ | |
| 1. Platform empty | 1 | 2 | 1 | 2 | 1 | 2 | 1 | 1 | 2 | Up. |
| 2. Container on. Push button operated. System starts to balance with empty container. | 1 | 1 | 1 | 1 | 1 | 1 | 1 | 1 | 2 | Starting to move down. |
| 3. Standard weight W on platform 7 and system balanced. | 2 | 2 | 2 | 2 | 2 | 1 | 2 | 2 | 2 | Right down. |
| 4. Standard weight being lifted from platform 7. | 1 | 2 | 2 | 2 | 2 | 1 | 1 | 1 | 2 | Moving up. |
| 5. Standard weight fully clear. Feeding starts. | 1 | 2 | 2 | 2 | 2 | 2 | 1 | 1 | 2 | Right up. |
| 6. Nozzle back pressure reaches 15 lbs/sq. inch. Feeding stops. | 1 | 2 | 1 | 2 | 1 | 2 | 1 | 2 | 2 | Do. |
| 7. Filled container removed from support 8. | 1 | 2 | 1 | 2 | 1 | 2 | 1 | 1 | 2 | Do. |

Valve position 1 = de-energised.
Valve position 2 = energised.

The spring rates of the bellows 6 and of the spring 3 are arranged so that when B is de-energised, for any change in weight between certain predetermined limits on the right hand side of the beam e.g. either 0 to 1 lb. or 55 to 56 lbs. the movement of the bellows, and hence of the left hand side of the beam, is always such as to maintain or restore the back pressure in nozzle 13 within 1 lb. per square inch of any predetermined back pressure, the predetermined back pressure being that formed when the beam is in a balanced position corresponding to a predetermined net load on the support 8.

It will be appreciated that the effect of the combination of nozzle 13, bellows 6 and spring 3 is to reduce the movement of the beam when there is any change in weight between certain fixed limits to a very small amount, so that if there is any change in the weight of the empty container this change is automatically compensated for by the operation of the bellows which reduces the movement of the beam caused by the change in tare to such a small amount that weighings may proceed without loss of accuracy. For example, automatic restoration of the back pressure to within 1 lb./square inch of a pre-set back pressure of 15 lbs./sq. inch in nozzle 13 is equivalent on the presently described apparatus to re-balancing the system to within ⅓ ounce for a change of tare weight of one pound. It will be appreciated in this embodiment the means for adjusting the weighing machine to the zero position includes the bellows 6 and the valve lever 4. The apparatus can only be used therefore for tare adjustment when the variation in tare weight is between certain pre-determined limits. For tare weights outside these limits, the locking device ensures that weighing cannot proceed further.

On operating the push button the system starts to rebalance by oil flowing into or out of bellows 6 to equalise the pressures in the bellows and the chambers 17, 18, so that the expansion or contraction of bellows 6 acting on valve lever A effects adjustment of the weighing machine to zero. At the same time the piston 22 descends and lowers the standard weight W on to the support 7. As the piston moves down the position switch F is first released and the piston continues to move down until it operates the position switch G.

When the standard weight is deposited on the platform the left hand side of the beam is forced upwards which causes the back pressure in chambers 17, 18 to increase. The relay N operates so that the pressure in the bellows increases and effects readjustment of the beam until the force due to the bellows balances the downward force of the spring 3, when readjustment ceases. At this point the back pressure in chambers 17, 18 is so close to the pre-set value that the beam is effectively in the zero position. This is position 3.

The means provided to lock the adjusting means preferably comprises a pneumatic switching device that can change from one switching condition to a different switching condition when there is a change of pressure at a particular value and which is in one of said conditions between two pre-determined pressures and in the other of said conditions at pressures above the higher of said two pressures and below the lower of said two pressures. The preferred form of locking means comprises two precision relays $P_1$ and $P_2$, one of which is adapted to change from one switching condition to its other switching condition at a particular pressure change and the other of which is adapted to change from one condition to its other condition at a different particular pressure change, the pneumatic circuit being arranged so that locking of the adjusting means is brought about by the combination of the conditions of the relays between said two particular pressures which combination operates a pneumatic valve to isolate the bellows. It is convenient to use two relays that are in the same condition between the two pressures, i.e. either both energised or both de-energised.

When balance is established precision relays $P_1$ and $P_2$ are energised thus energising valve A. With the piston right down, position switch G is also operated so that air at 25 lbs./sq. inch is fed through the ports of valves $P_1$, $P_2$, G and A to valve C and also through the restrictor $R_D$ to valves D and B. The energising of valve B causes the position of bellows 6 to be locked, and the energising of valve D causes air to flow at 25 lbs./sq. inch through the port of valve D to the cylinder to move the piston upwards and raise the standard weight from the platform. Valve D provides its own hold on and can only be de-energised, together with valve B, by the operation of the push button. It will be seen that valve B cannot be energised unless both precision relays $P_1$ and $P_2$ are energised when balance is reached immediately following adjustment. This means that in effect the apparatus will only accept containers with tare weights with pre-determined tolerances.

As the standard weight is raised off the platform, position switch G is de-energised, the left hand side of beam 1 falls and the back pressure in nozzle 13 falls below the pre-set value causing $P_1$ to be de-energised (operation 4 of the table).

With the standard weight clear of the platform the beam remains in the displaced position because bellows 6 is now isolated from the tare-offsetting system and can no longer operate to adjust the position of the beam. When the piston is right up position switch F is caused to operate. In this position (stage 5 of the table) valve A is de-energised but valve C remains energised by its own connection to the 25 lbs./sq. inch air supply. Valves B, D, and E also remain energised.

With valve E energised from stage 3 onwards, the operation of the sleeve valve 9 is controlled by the back pressure in the nozzle 13 controlling relays N and V. In order to allow the valve 9 to feed easily, the relay N is adapted to allow air to pass only when the pressure in nozzle 13 is 4 lbs./sq. inch or more. Therefore when the standard weight is lifted off, the back pressure in nozzle 13 first falls allowing the pressure in valve 9 to fall and therefore the feed to start. As the pressure in nozzle 13 increases and rises above 4 lbs./sq. inch the controlling pressure on the sleeve valve increases thus reducing the rate of feed. The position of the nozzle 13 with respect to the beam is arranged so that the back pressure does not start to increase until the weight fed is within a few pounds of the final weight. When the nozzle pressure reaches the pre-set value of 15 lbs./sq. inch $P_1$ is energised causing A to be de-energised, which in turn causes C to be de-energised through connections A, G and F. With C de-energised E is vented to atmosphere and allows the full 25 lbs./sq. inch air supply to be fed to the sleeve valve ensuring a tight shut off (stage 6 of the table). The presence of the restrictor $R_D$ in the circuit ensures that valves D and B remain energised when C is de-energised.

When the filled container is removed from the platform the back pressure in nozzle 13 falls causing $P_1$ to be de-energised. The state of the relays is shown at stage 7 of the table which is the same as stage 1.

The purpose of precision relay $P_2$ is to prevent feeding from starting if the automatic taring should produce an overshoot in the nozzle pressure, or if the tare weight is above the permitted maximum.

In the embodiment hereinbefore described, the pressure controlling device comprises a chamber having orifices from which air from a common source is directed from opposite sides of an aperture, and across which orifices an element of the weighing machine can move to interrupt the flow of air. A device having this form is particularly advantageous since by selecting suitable sizes of orifice, width of aperture and thickness of element, the back pressure developed in the chamber can be made to vary considerably with very small movements of the element. Pressure controlling devices having this form have the further advantage that since the air pressure on either side of the element is the same, the air pressure has no effect on the movement of the element. Also since the element is free to move past the orifices in either direction, any vibrations of the element when it is close to the orifices are not likely to cause any damage to the orifices.

The pressure controlling device may take other forms. Thus, for example, air issuing from a nozzle may be made to impinge directly on the weighing machine beam so that as the beam rises it reduces the air flow and thus increases the back pressure.

Our apparatus can be applied to weighing machines other than the beam type hereinbefore described. For example it can be applied to a cantilever type weighing machine. Also, where the adjustment is effected by changing the position of a spring, the adjustable spring can be an auxiliary spring which is present in addition to the main spring which forms the principal load counterbalancing means.

In the embodiments particularly described, the means for controlling the flow of material to the container is a valve having the form of a flexible-walled tube through which the material can flow, which is surrounded by a rigid casing forming an enclosed chamber with the outer wall of the tube, the casing being provided with one or more entries to allow air under pressure to be introduced into the chamber, or to allow pressure within the chamber to be reduced to atmospheric. A valve of this kind is particularly suitable for use in our pneumatic method of controlling the rate of flow of material to the weighing machine. It allows a wholly pneumatic system to be used and therefore the whole arrangement is relatively simple. It is precise in operation and when used in our invention to reduce the rate of feed as the end point is approached in a continuous manner, allows accurate control of the amount of material fed to be maintained. The use of valves of this kind in our apparatus is therefore a preferred feature of our invention.

It will be appreciated that other forms of feed limiting devices may be used. Thus, for example, the pneumatic control may be used to control an electric circuit so that its voltage output increases as the back pressure increases, and this source of electric energy is then used to control a valve or other device that controls the rate of feed of material to the weighing machine. For example, a vibrating feeder may be used and its amplitude can be reduced by a means of this kind, the reduction in amplitude causing a reduction in the feed rate.

We claim:

1. In combination, a weighing machine including a weight measuring control element carried thereby, weight control means, means for supporting a container, and means for feeding flowable material therein; pneumatic means for automatically controlling the feed of flowable material to a container on said supporting means including: means providing a source of constant air pressure, chamber means restrictively connectable to said air pressure source, said chamber means including a small orifice opening from which said air emerges, said pneumatic means being operative for attachment to said weighing machine wherein a change of weight over a predetermined range of weights upon said weighing machine causes relative movement between said chamber means and said control element, and wherein said air issuing from said orifice impinges upon said control element during at least part of said relative movement wherein progressive reduction of the space near said orifice resulting from said relative movement causes an increase in back pressure in said chamber means, said back pressure being operative to control the feeding means for the flowable material wherein the feed is caused to stop at a predetermined pressure; adjusting means acting on at least a part of the weight counterbalancing means for restoring said chamber means and said control element to a balanced position when any weight causes a departure therefrom, said adjusting means including a fluid vessel arranged for attachment to said weighing machine and including a part that moves in response to a change of pressure within said vessel to give rise to a force operative to effect a displacement of said weight counterbalancing means in a direction to restore a balance position; means for connecting said chamber means to said vessel wherein any pressure change in said chamber means during adjustment is followed by a corresponding change in said vessel to maintain a fixed pressure relationship therebetween and adjustment ceases when said force balances the force positioned by any weight; and means controlled by the back pressure in said chamber means for locking said adjustment means wherein no further adjustment takes place without a further change in weight.

2. The combination defined in claim 1 wherein said chamber means is constructed and arranged to provide movement of said control element parallel to and in close proximity to a flat face of said chamber containing said orifice.

3. The combination defined in claim 2 wherein the relationship between the back pressure developed in said chamber and the linear movement of said control element is of the second or higher order.

4. The combination defined in claim 2 wherein said orifice is circular.

5. The combination defined in claim 3 wherein said chamber means includes a metal block having a parallel sided slit, said block having at least one passage opening into said slit from which said air emerges and said control element comprises a thin feeler gauge adapted to move in said slit to interrupt the flow of air from said passage into said slit.

6. The combination defined in claim 5 wherein said fixed pressure relationship between said chamber and said vessel is a 1:1 relationship.

7. The combination defined in claim 6 including a pneumatic relay controlled by fluid pressure in said chamber means, said relay being connected to said vessel to feed fluid thereto to maintain said fixed pressure relationship between said chamber means and vessel during adjustment.

8. The combination defined in claim 7 wherein said fluid vessel is a bellows having its lower end adapted for rigid support and its upper end free to move vertically, said upper end being connectable through an elastic coupling to the weight-counterbalancing mechanism.

9. The combination defined in claim 8 wherein said elastic coupling is a spring, one end of which is operatively connectable to the weight-counterbalancing mechanism and the other operatively connected to the upper part of said bellows.

10. The combination defined in claim 1 wherein said locking means includes a pneumatic switching device operative to change from one switching condition to a different switching condition when there is a predetermined change of pressure in said chamber means and which is, in one of said switching conditions, between two predetermined pressures, and in the other switching position at pressures above the higher of said two pressures or below the lower of said two pressures.

11. The combination defined in claim 10 wherein said locking means comprises two precision relays, one of which changes from one switching condition to its other switching condition at a predetermined pressure change, and the other of which changes from one switching condition to its other switching condition at a different predetermined pressure change, the pneumatic circuit being arranged so that locking of the adjusting means is brought about by the combination of the switching conditions of the relays betwen said two predetermined pressures which combination causes a pneumatic valve to operate to isolate the bellows.

12. The combination defined in claim 11 wherein said weighing machine is a beam weighing machine.

13. The combination defined in claim 12 wherein one end of said spring is connected to the beam of said weighing machine and the other end of said spring is connected to a lever attached to the upper end of said bellows, expansion of said bellows tending to cause extension of said spring.

14. The combination defined in claim 13 in which the spring rates of said bellows and spring are such that for any change of weight between predetermined limits the movement of the bellows always maintains or restores the back pressure in said chamber means to within one pound of the predetermined back pressure corresponding to that formed when the beam is in the said balanced position.

15. The combination defined in claim 11 wherein a standard weight corresponding to the net weight desired to be fed to a container is adapted to be supported by the weighing machine with an empty container during adjustment and is thereafter arranged to be removed from the weighing machine.

16. Weighing equipment according to claim 15 in which the movement of the beam is limited by stops which are arranged so that the movement of the beam corresponds to the addition of the last 20% of the net weight of the material to be fed.

References Cited in the file of this patent
UNITED STATES PATENTS

| | | |
|---|---|---|
| 2,773,685 | Aagaard | Dec. 11, 1956 |
| 2,851,063 | Leinhart | Sept. 9, 1958 |
| 3,024,857 | Charcuset | Mar. 13, 1962 |